July 11, 1961

P. R. POWELL 2,991,619

HYDRAULIC VARIABLE SPEED TRANSMISSION

Filed July 3, 1958

INVENTOR.
PAUL R. POWELL
BY
*Shoemaker & Mattare*
ATTORNEYS.

INVENTOR.
PAUL R. POWELL
BY
Shoemaker + Mattare
ATTORNEYS.

July 11, 1961   P. R. POWELL   2,991,619
HYDRAULIC VARIABLE SPEED TRANSMISSION
Filed July 3, 1958   6 Sheets-Sheet 6

INVENTOR.
PAUL R. POWELL
BY
Shoemaker + Mattare
ATTORNEYS.

United States Patent Office 2,991,619
Patented July 11, 1961

2,991,619
HYDRAULIC VARIABLE SPEED TRANSMISSION
Paul R. Powell, 205 Stony Run Lane, Baltimore 10, Md.
Filed July 3, 1958, Ser. No. 746,468
15 Claims. (Cl. 60—53)

The present invention relates to a new and novel hydraulic variable speed transmission, and more particularly to a transmission mechanism for transmitting power from a driving element rotating at constant speed to a driven element which it is desired to rotate at varying speeds as required, and having a manually operable means for controlling the speed of the driven element.

In many machine and automotive applications, it is desirable to provide a transmission wherein the constant speed of a driving element may be transmitted at an infinite number of ratios to a driven element. In such applications, it is desirable to obtain a 1:1 ratio with a minimum of slippage, and it is desirable to adjust the transmission such that substantially no drive is transmitted from the driving element to the driven element, whereby the transmission has a 1:0 ratio between the driving and driven elements.

Numerous transmissions have been designed in the prior art employing intricate speed reducing gear trains and clutches in order to provide a number of different speed ratios. These types of transmissions are excessively complex and expensive in construction. Accordingly, hydraulic infinitely variable transmissions have been designed to overcome the disadvantages of gear type transmissions. Prior art hydraulic transmissions have obtained limited success in certain fields, but have also proved to be complex and expensive in construction, and as a consequence of the complexity thereof, have not provided adequate reliability in operation. In addition, known hydraulic transmissions also require additional gear mechanism in order to obtain reverse rotation of the driven element with respect to the driving element, thereby adding to the expense and bulk of the mechanism.

The present invention provides a structure wherein an infinitely variable ratio may be selectively obtained between the driving and driven elements, and conventional speed reducing gear trains and clutches are eliminated entirely. According to the present invention, a driving shaft is rotatably journalled in a housing and has fixed thereto an inner rotor. A driven shaft in alignment with the driving shaft is also rotatably journalled in the housing and has an outer rotor secured thereto which surrounds the inner rotor and forms an annular working chamber between the two rotors. Inner vanes are movably supported by the inner rotor and outer vanes are movably supported by the outer rotor. An apertured control means is disposed between the inner and outer vanes and is supported by a plate member which is constrained from rotation and forms one side wall of the annular working chamber of the device.

In one modification of the invention, the control means comprises a first member fixed to the plate and a second member which is laterally shiftable with respect to the first fixed member. In a second modification, the control means comprises a single ring-like member fixed to the plate, and the plate is laterally shiftable relative to the housing. In each modification, the shiftable control means is provided with an inner surface which is concentric with the outer surface of the inner rotor such that a 1:0 ratio is obtained between the driving and driven elements when the control member is in neutral position. At the limit of movement in one direction of the control means, a substantially 1:1 ratio is obtained between the driving and driven members, and at the opposite limit of movement of the control means the driven element is caused to move in a direction reverse to that of the direction of movement of the driving element. An inner cam means is provided for causing the inner vanes to be in engagement at all times with the inner surface of the shiftable control means, and an outer cam means is provided for causing the outer vanes to be in engagement at all times with the outer surface of the control means. In this manner, a minimum amount of leakage of fluid within the hydraulic transmission is permitted between the vanes and the control means, thereby increasing the efficiency of the device to a maximum.

A manually operable means is provided for actuating the control means to any desired position, and may be easily operated from the exterior of the fixed housing of the transmission. The structure of the present invention is simple and inexpensive to manufacture, yet is very sturdy and provides high reliability when operated for extended periods of time.

An object of the present invention is to provide a new and novel hydraulic variable speed transmission which provides infinitely variable speed ratios between driving and driven elements.

Another object is the provision of a hydraulic transmission which eliminates the necessity of providing speed reducing gear trains and clutches.

A further object of the invention is to provide a hydraulic transmission wherein a ratio of 1:0 may be obtained between the driving and driven elements and an efficient 1:1 drive may also be provided therebetween.

Yet another object is the provision of a hydraulic transmission wherein the driven element may be driven in a direction reverse to that of the driving element.

Still a further object of the invention is to provide a hydraulic variable speed transmission which is simple and inexpensive in construction, yet sturdy and reliable in operation.

Other objects and many attendant advantages of the present invention will become more evident when considered in connection with the following specification and accompanying drawings wherein:

Figure 1:
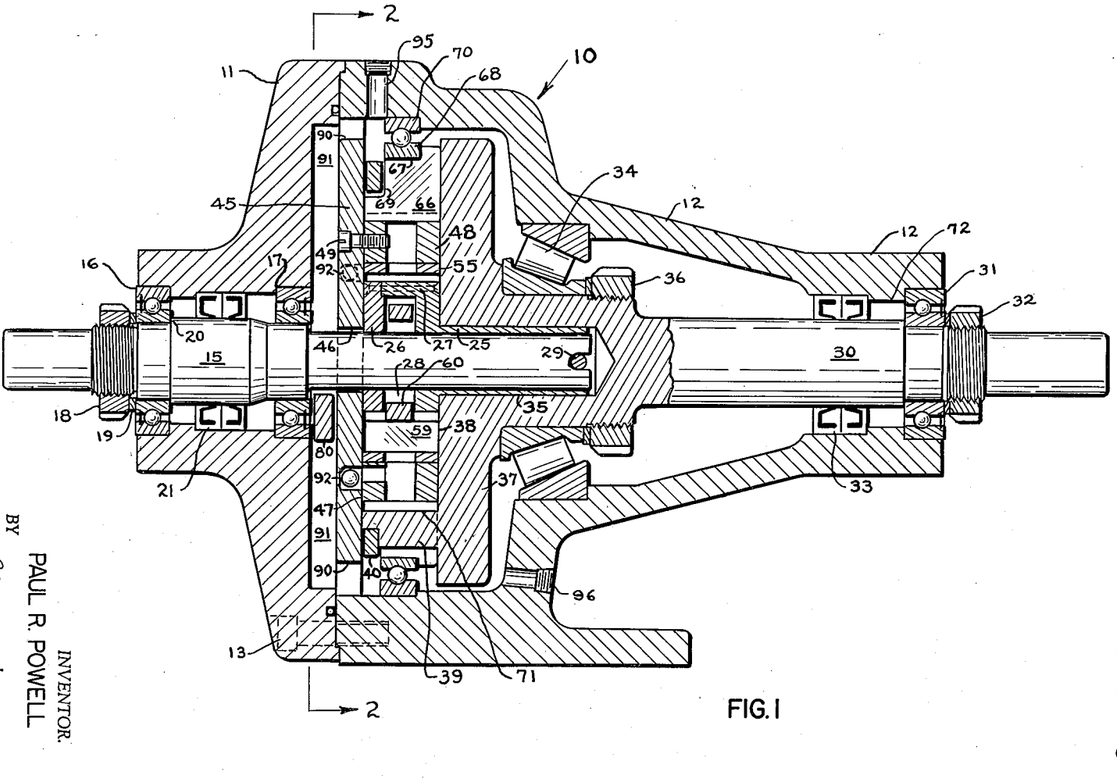
FIG. 1 is a longitudinal section of a hydraulic variable speed transmission according to the present invention.
Figure 2:
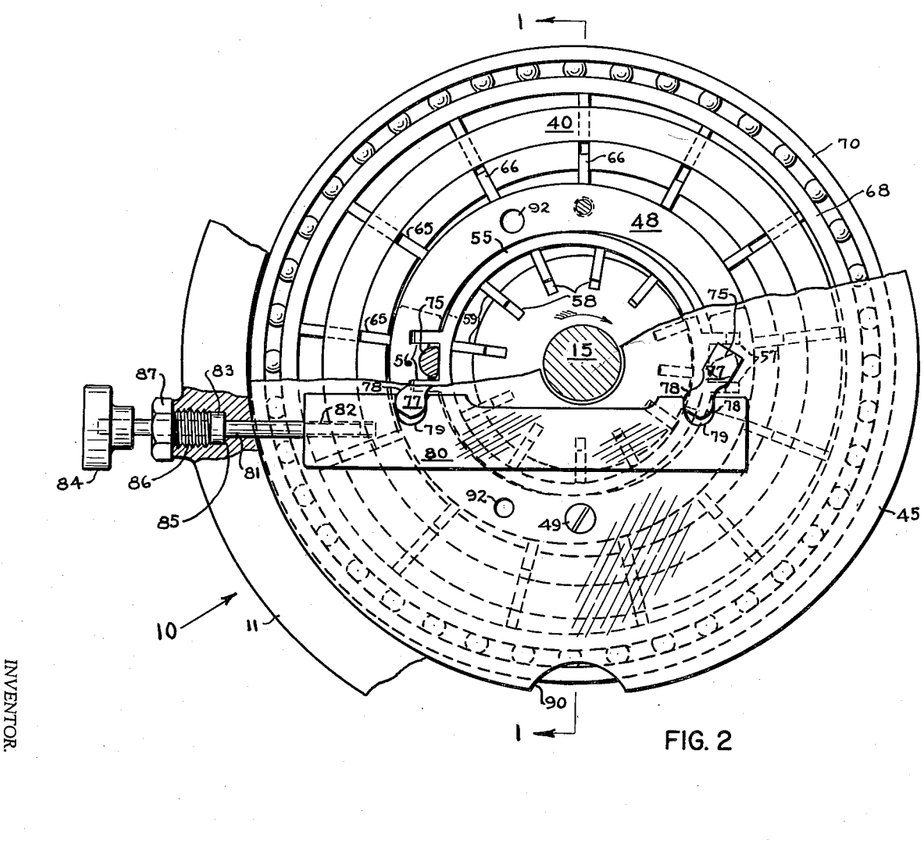
FIG. 2 is a cross-sectional view, partly cut away, taken on the line 2—2 of FIG. 1 looking in the direction of the arrows.

Referring now to the drawings wherein like reference characters designate corresponding parts throughout the several views, there is shown in FIGS. 1 and 2 a fixed housing indicated generally by reference character 10 and comprising two hollow members 11 and 12 secured to one another by bolts 13 when in assembled position. A drive shaft 15 is journalled within roller bearings 16 and 17 mounted in housing member 11, and a nut 18 is provided for maintaining roller bearing 16 in place between a washer 19 and shoulder 20 formed on drive shaft 15. Any suitable means (not shown), such as a conventional electric motor or the like, may be employed for driving the drive shaft at a substantially constant speed. An oil and air seal 21 is disposed about drive shaft 15 for sealing the conventional operating fluid, such as oil or the like, within the housing.

An inner rotor comprising a sleeve member 25 and an annular member 26 are secured to one another by rivets 27, sleeve member 25 being cup shaped adjacent member 26 for providing an annular cavity 28 between sleeve member 25 and member 26 of the inner rotor. The sleeve member is drivingly connected to the drive shaft by means of a radially extending pin 29 positioned within a suitable slot formed in the shaft and extending through a pair of diametrically opposite openings in the sleeve.

A driven shaft 30 is rotatably journalled within roller bearing 31 held in place by a nut 32 threaded on the driven shaft. An oil and air seal 33 is disposed about driven shaft 30 for sealing the operating fluid within the housing. The driven shaft is also journalled within a suitable bearing 34 and has a cylindrical recess 35 formed in the forward end thereof which receives sleeve 25 mounted on the driving shaft, whereby the forward end of the driven shaft is supported by and maintained in alignment with the driving shaft. The nut 36 maintains roller bearing assembly 34 in proper position relative to the driven shaft.

The forward end of the driven shaft has formed integral therewith a radially extending flange 37, the forward wall 38 of which forms one side wall of the working chamber of the apparatus, and an annular flange 39 in conjunction with an annular ring 40 pressed thereon defines an outer rotor surrounding the inner rotor, whereby an annular chamber is provided between the inner and outer rotors.

A plate 45 is fixed within housing 10 and has a central opening 46 formed therethrough through which drive shaft 15 extends. The inner surface 47 of plate 45 forms a side wall of the working chamber opposite to the side wall 38 formed integral with the driven shaft. A ring-like control member 48 is fixed by means of bolts 49 and plate 45, member 48 being provided with diametrically opposite circumferentially extending slots 50 and 51 as seen most clearly in FIGS. 7, 8 and 9. A laterally shiftable ring-like control member 55 has a pair of lugs 56 formed at diametrically opposite portions thereof, the lugs being slidably disposed within corresponding guiding slots 57 formed in control member 48. The inner rotor has a plurality of radially extending solts 58 formed therein, and a substantially rectangular vane member 59 is slidably disposed in each of the slots. A substantially annular cam member 60 is mounted within cavity 28 defined by the inner rotor and is freely movable therein. The outer surface of cam member 60 engages the inner ends of vanes 59 and is so dimensioned as to maintain the outer ends of the vanes 59 in engagement at all times with the inner surface of shiftable control member 55.

Flange 39 of the outer rotor has a plurality of radially extending slots 65 formed therein, and each of these slots has an outer vane 66 slidably disposed therein. As seen most clearly in FIG. 1, each of vanes 66 has a shoulder 67 formed thereon which engages the inner surface of an outer cam 68 of substantially annular configuration. Each of vanes 66 is also cut away at 69 to provide clearance with member 40 of the outer rotor. Outer cam member 68 actually forms the inner race of the roller bearing, the outer race 70 thereof being mounted within member 12 of the housing.

Figure 8:
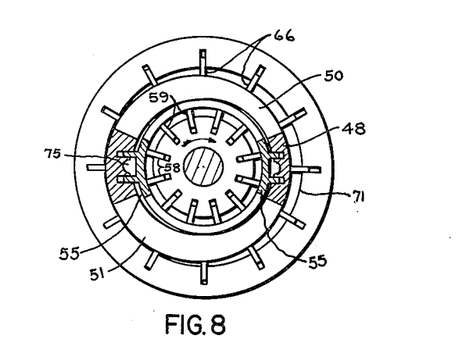
FIG. 8 is a view similar to FIG. 7 illustrating the neutral driving position.

As seen most clearly in FIG. 8, the outer surface of the inner rotor is cylindrical in configuration, and the inner and outer surfaces of shiftable control member 55 are concentric with the outer surface of the inner rotor. The inner surface of fixed control member 48 is not cylindrical in configuration, but as seen in FIG. 8, has a greater horizontal dimension than vertical dimension, thereby permitting shiftable member 55 to be moved laterally relative thereto. The outer surface of fixed control member 48 is eccentric to the outer surface of the inner rotor, and the inner surface 71 of flange 39 of the outer rotor is concentric with the outer surface of the inner rotor. The inner surface of outer cam member 68 is eccentric to the outer surface of the inner rotor, and is concentric with the outer surface of fixed control member 48, whereby the distance between the inner surface of the outer cam member and the outer surface of the fixed control member is constant throughout the circumference thereof such that the inner ends of outer vane member 66 are maintained in contact with the outer surface of fixed control member 48 at all times. It is apparent that the seat formed in housing member 12 for the outer race 70 of the ball bearing supporting the outer cam 68 is accordingly machined such that it is eccentric to the opening 72 of the housing member which receives the driven shaft.

Figure 3:
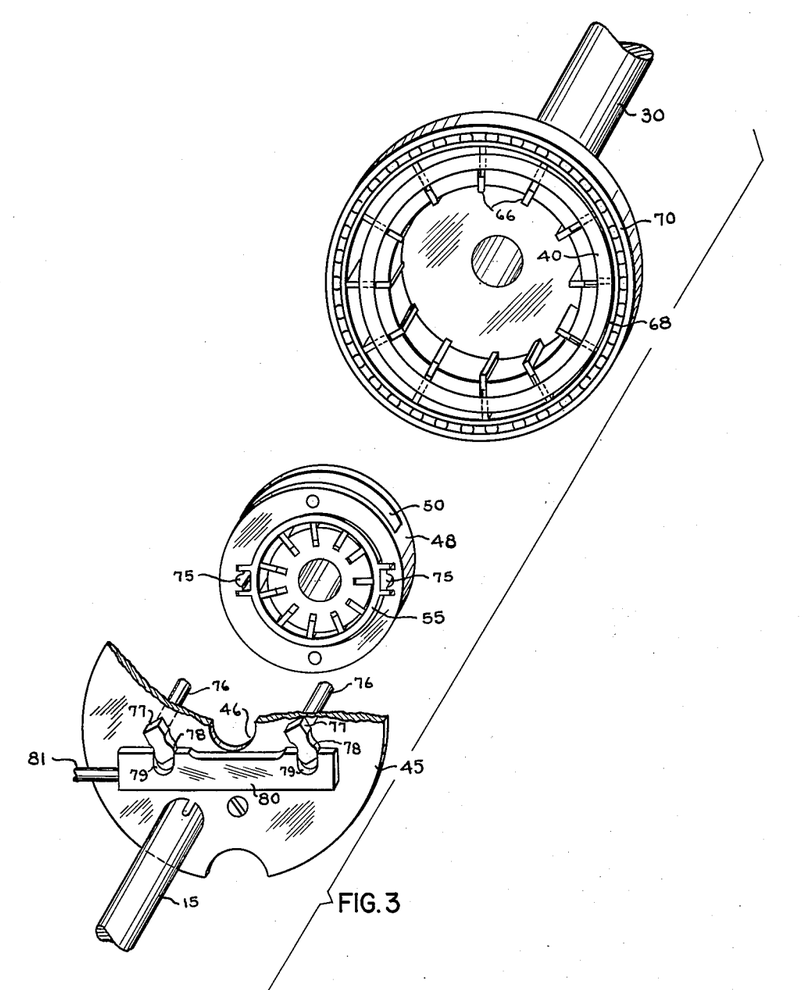
FIG. 3 is an exploded view, partly cut away, of the device shown in FIGS. 1 and 2.

The means for shifting control member 55 may be seen more clearly by reference to FIGS. 2 and 3 and comprises two diametrically opposite cam members 75 which engage the outer surface of shiftable member 55. Cams 75 are formed integral with shafts 76 extending through and journalled within plate 45, the opposite ends of shafts 76 having formed integral therewith lugs 77, each of which has curved surfaces 78 formed on opposite lateral sides at the lower portion thereof. The lower portions of lugs 77 are disposed within suitable slots 79 formed in an operating arm 80, and it is apparent that the lateral shifting of operating arm 80 will act upon curved surfaces 78 of lugs 77 to operate the cam members. An operating rod 81 extends through a suitable opening provided in the casing and has an inner threaded end portion which is threaded within a correspondingly threaded opening 82 formed in one end wall of arm 80. An annular collar 83 is formed integral with rod 81, and an operating knob 84 is fixed to the outer end of the rod. Collar 83 is seated against a shoulder 85 formed at the bottom of a threaded opening 86 in the side wall of housing member 11. A threaded nut 87 is mounted in opening 86 and engages collar 83 for maintaining the operating rod 81 in proper position. It is evident that rotation of knob 84 will produce lateral movement of operating arm 80, thereby rotating cam 75 and shifting control member 55 thereby varying the stroke of inner vanes 59 of the device.

Plate 45 has two diametrically opposite cut out portions 90 which are in communication with cut out portion 91, whereby the fluid within the housing may flow from the cavity within housing member 12 into the cavity within the housing member 11. Two diametrically opposite check valves 92 are formed through plate 45 and provide communication with the annular working chamber defined between the inner and outer rotors. During operation, any oil which may leak past vanes 66 under high pressure is thereby permitted to flow back through openings 90 and check valves 92 so as to return to the working chamber of the apparatus. An opening 95 is provided through the upper portion of the housing member 12 and another opening 96 is formed through the bottom portion thereof. Openings 95 and 96 are adapted to be connected with suitable conduits leading to a conventional cooling mechanism (not shown), whereby the fluid within the housing may be cooled to prevent overheating of the device, and such cooling mechanism may also be employed to remove any air which may be present in the operating fluid. Of course, openings 95 and 96 may have plugs inserted therein if it is not desired to cool the hydraulic fluid.

Figures 4, 5:
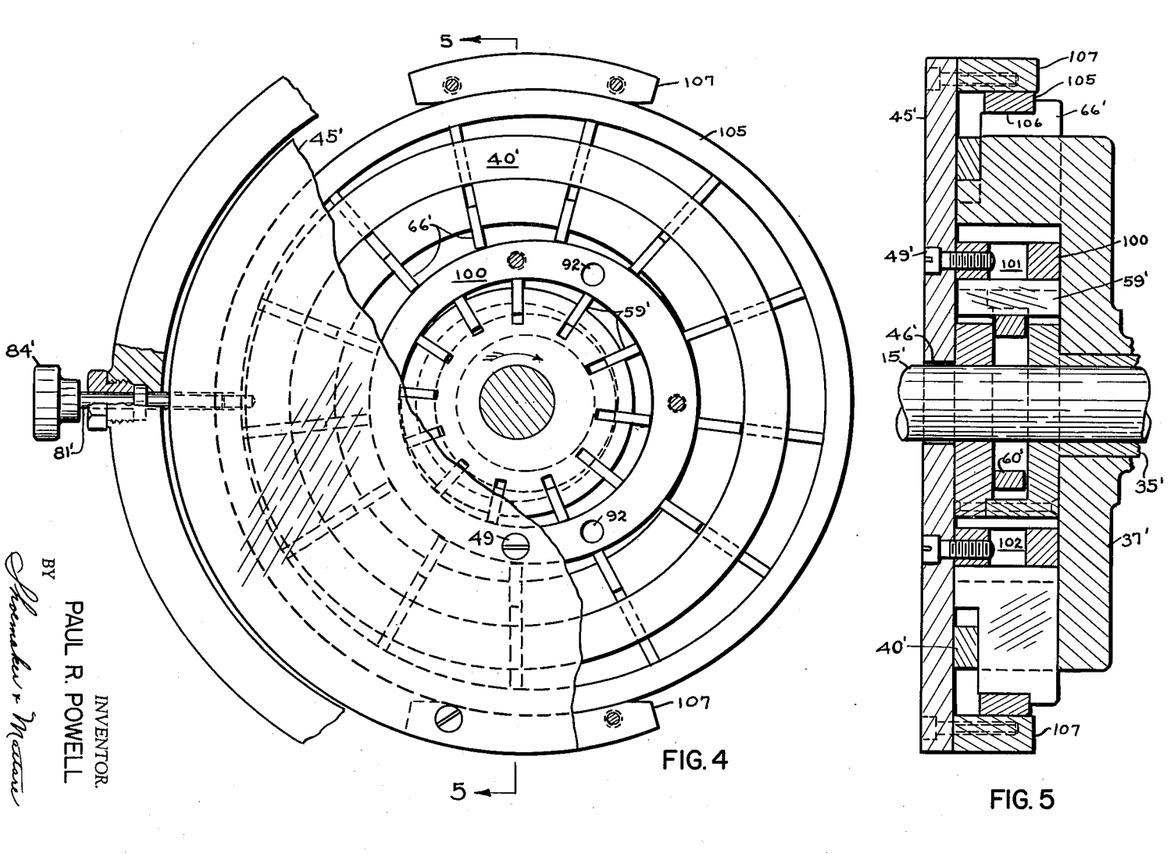
FIG. 4 is a cross-sectional view, partly cut away, of a modification of the present vacation.
FIG. 5 is a longitudinal section taken on the line 5—5 of FIG. 4 looking in the direction of the arrows.

Referring now to FIGS. 4 and 5, a modification of the device is illustrated similar to that of FIGS. 1–3 wherein corresponding parts have been given similar reference numerals primed. The plate 45' of the modification is provided with an elongated opening 46' in the center thereof whereby the plate may be shifted laterally with respect to the housing in contrast to the device shown in FIGS. 1–3 wherein the plate is stationary within the housing. An operating mechanism identical with that of the device as shown in FIGS. 1–3 is employed for shifting the plate, the only difference being that the operating rod is threaded directly into the shiftable plate 45'. Whereas in the device shown in FIGS. 1–3 the control means comprises a fixed member 48 and a shiftable member 55, the control means of the modification comprises a single ring-like apertured member 100 which is fixed to plate 45' and accordingly is shifted therewith. As seen most clearly in FIGS. 10–12, the member 100 is provided with diametrically opposite circumferentially extending slots 101 and 102, the inner surface of the control member 100 being concentric with the outer surface of the inner rotor, and the outer surface of control member 100 being eccentric to the outer surface of the inner rotor.

Figure 6:
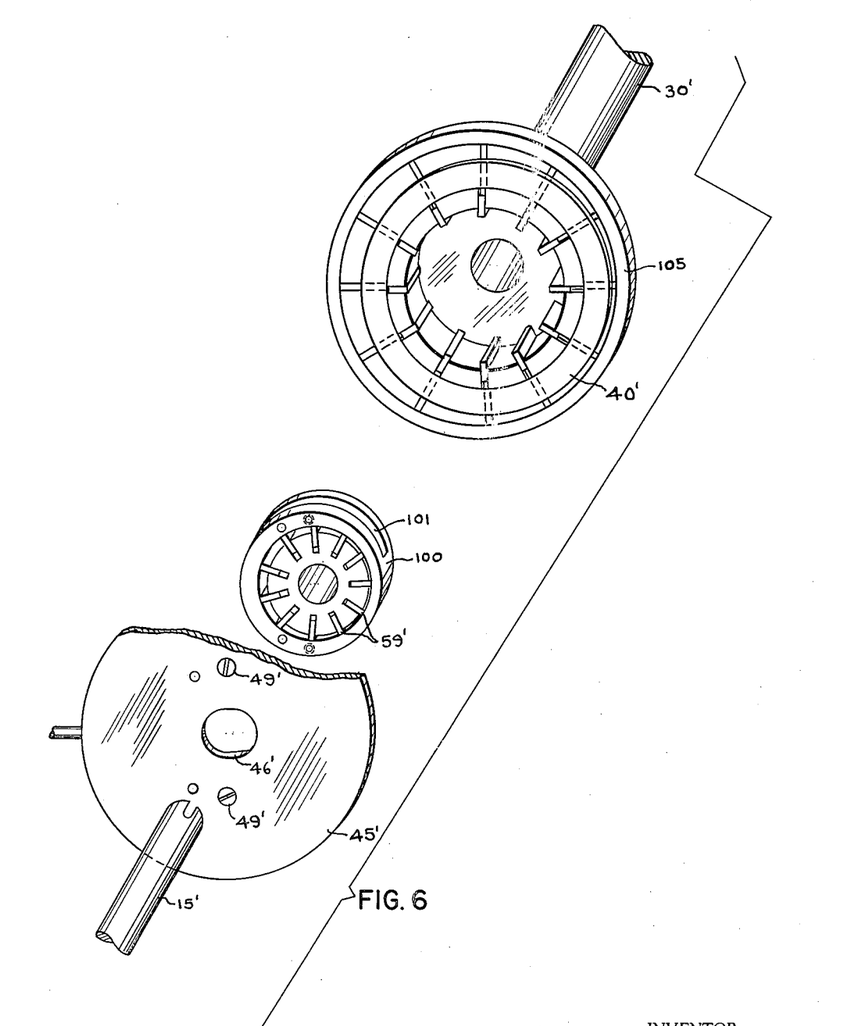
FIG. 6 is an exploded view, partly cut away, of the device shown in FIGS. 4 and 5.

An outer cam member 105 has an inner surface 106 which engages an outer portion of each of outer vanes 66' for maintaining the outer vanes in engagement with the outer surface of control member 100 in a manner similar to that in which outer cam member 68 of FIG. 1 operates. Annular cam ring 105 is supported in position by a plurality of equally spaced bearings 107 shown as being two in number, although it is apparent that any number of bearings may be employed as desired. Each of bearings 107 comprises a substantially shoe-like member having an arcuate inner surface complementary to the outer surface of cam ring 105. Bearings 107 are of a suitable material, such as bearing bronze, and in order to reduce the friction between the contacting surfaces of bearings 107 and cam ring 105, an oil lubricant or the like may be pumped in between these surfaces. Bearings 107 are mounted on plate 45' whereby upon shifting movement of plate 45', bearings 107 cause cam ring 105 to move simultaneously with ring 100, thereby maintaining the inner surface of the cam member concentric with the outer surface of the control member. In this manner, the inner ends of vanes 66' are maintained in engagement with the outer surface of control member 100 at all times. The remaining components of the device shown in FIGS. 4–6 are similar to those shown in FIGS. 1–3.

*Mode of operation*

Figure 7:
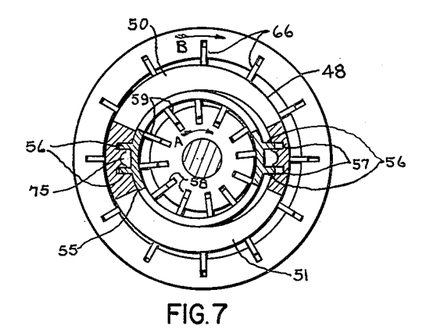
FIG. 7 is a view illustrating the relative position of the components of the device shown in FIGS. 1–3 in 1:1 forward driving position.

The mode of operation of the modification shown in FIGS. 1–3 will be described first. Referring to FIG. 7 of the drawings, the inner rotor is driven in the direction of arrow A and the shiftable control member 55 is in the 1:1 ratio forward drive position. As the inner rotor rotates, vanes 59 move radially inwardly and outwardly within their corresponding slots under the influence of the inner surface of control member 55. Operating fluid will be carried from the lower portion of the apparatus upwardly by the vanes on the left side of the apparatus as seen in FIG. 7 through the slots formed in control members 48 and 55 and into engagement with outer vanes 66, whereby the outer rotor and driven shaft will be rotated in the direction of arrow B. The fluid carried into the lower portion of the apparatus by outer vanes 66 as they rotate will pass back through the lower slots in the control members, whereupon the fluid is again picked up by the inner vanes 59 as they rotate downwardly into the lower portion of the apparatus.

As shiftable control member 55 is shifted to the right as seen in the drawings, the speed of the device will be reduced, and when member 55 is centered or in neutral position as seen in FIG. 8, the amount of fluid pumped into the upper portion of the apparatus by the inner vanes is exactly equal to the amount pumped out by the inner vanes, whereupon no driving force will be transmitted to the outer rotor, and the 1:0 ratio is obtained between the driving and driven elements. In this manner, the device is fully equivalent to a disengaged clutch since the driving element is still rotating at full speed and the driven element is at rest.

Figures 9, 12:
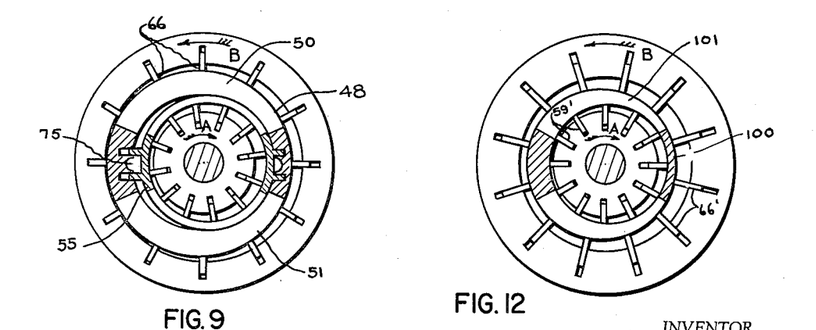
FIG. 9 is a view similar to FIGS. 7 and 8 illustrating the reverse driving position.
FIG. 12 is a view similar to FIGS. 10 and 11 illustrating the device in reverse driving position.

FIG. 9 illustrates the device wherein the control member 55 has been shifted to the right to its limit of movement whereupon the apparatus is in reverse position. In this position, more fluid is pumped into the lower portion of the apparatus than into the upper portion thereof so that the lower portion becomes the pressure side, and since the area of the outer vanes on the right hand side is greater than that on the left hand side of the device as seen in FIG. 9, the outer rotor will be driven in the direction of arrow B which is the reverse of the direction of rotation of the inner rotor as indicated by arrow A.

Figure 10:
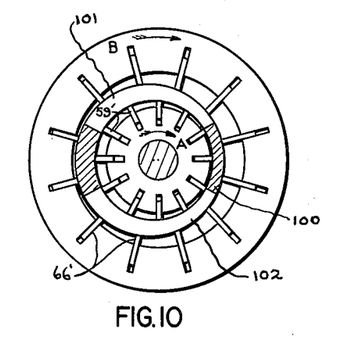
FIG. 10 is a view illustrating the relative position of the components of the device shown in FIGS. 4–6 in 1:1 forward driving position.
Figure 11:
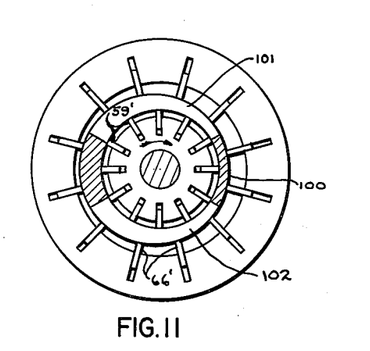
FIG. 11 is a view similar to FIG. 10 illustrating the device in neutral position.

Referring now to FIGS. 10–12, the operation of the modification shown in FIGS. 4–6 is illustrated. As shown in FIG. 10, the control member 100 is in the full forward speed position and the operation of the device is similar to that of the device shown in FIG. 7. As shown in FIG. 11, the control member has been shifted to center or neutral position, and in this position the same amount of fluid is pumped into the upper portion as is pumped out of the upper portion and a similar condition exists in the lower portion of the apparatus, whereby no drive is transmitted to the outer rotor. FIG. 12 illustrates the control member in reverse position, and the operation in this position is similar to that shown in FIG. 9 since the lower portion of the apparatus now becomes the pressure side and the greater area of the outer vanes is on the right hand portion of the apparatus as seen in FIG. 12, whereby the outer rotor is caused to rotate in the direction of arrow B.

It is apparent from the foregoing that there is provided a new and novel hydraulic variable speed transmission which provides infinitely variable speed ratios between driving and driven elements. The invention structure completely eliminates the necessity of providing speed reducing gear trains and clutches as are commonly employed in present transmissions, and the device operates efficiently at substantially 1:1 ratio between the driving and driven elements. The control means of the apparatus may be shifted into a neutral position such that the transmission acts effectively as a disengaged clutch whereby a 1:0 ratio is obtained between the driving and driven elements, and the control means may also be shifted so as to cause the driven element to rotate in the direction opposite to that of the driving element. The apparatus is quite simple and inexpensive in construction, and yet is sturdy and reliable in operation.

As this invention may be embodied in several forms without departing from the spirit or essential characteristics thereof, the present embodiment is therefor illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A hydraulic variable speed transmission which comprises a drive shaft, an inner rotatable rotor connected to said drive shaft, a driven shaft having an axis of rotation in fixed relationship to the axis of rotation of said drive shaft, an outer rotatable rotor connected to said driven shaft and surrounding said inner rotor, a control means positioned between said inner rotor and said outer rotor and constrained from rotation, said control means having fluid passageways formed therethrough and extending from the inner surface thereof to the outer surface thereof, a first working chamber being disposed between said inner rotor and said control means, a second working chamber being disposed between said outer rotor and said control means, means forming a first side wall of said working chambers, means forming an opposite side wall of said working chambers, inner vanes movably supported by said inner rotor for movement radially with respect thereto, and projectable into said first working chamber, outer vanes movably supported by said outer rotor for movement radially with respect thereto and projectable into said second working chamber, said control means being laterally shiftable radially with respect to said rotors for varying the stroke of said inner vanes, and means engaging said outer vanes for maintaining the outer vanes in proper operative position during operation.

2. Apparatus as defined in claim 1, wherein said last-mentioned means comprises an outer cam means having an inner surface engaging radially outward portions of said outer vanes at all times to maintain said outer vanes in proper operative position during operation.

3. A device as defined in claim 1, including an inner cam means having outer surface engaging the radially inward portions of said inner vanes at all times to maintain said inner vanes in proper operative position during operation.

4. A hydraulic variable speed transmission which comprises a hollow housing, an inner rotatable rotor supported in said housing, a drive shaft connected to said inner rotor, an outer rotatable rotor supported in said housing and surrounding said inner rotor, a plate member mounted in said housing and constrained from rotation, a control means supported by said plate member and having fluid passageways formed therethrough extending from the inner surface thereof to the outer surface thereof, a first working chamber being disposed between said inner rotor and said control means, a second working chamber being disposed between said outer rotor and said control means, inner vanes movably supported by said inner rotor and projectable into said first working chamber, outer vanes movably supported by said outer rotor and projectable into said second working chamber, said control means being shiftable laterally for varying the stroke of said inner vanes, said plate member forming one side wall of each of said working chambers, said outer rotor being drivingly connected to a radially extending flange, said flange forming another side wall of each of said working chambers.

5. A hydraulic variable speed transmission which comprises a drive shaft, an inner rotatable rotor connected to said drive shaft, a driven shaft, an outer rotatable rotor connected to said driven shaft and surrounding said inner rotor, a control means positioned between said inner rotor and said outer rotor and constrained from rotation, said control means having fluid passageways formed therethrough and extending from the inner surface thereof to the outer surface thereof, a first working chamber being disposed between said inner rotor and said control means, a second working chamber being disposed between said outer rotor and said control means, means forming a first side wall of said working chambers, means forming an opposite side wall of said working chambers, inner vanes movably supported by said inner rotor and projectable into said first working chamber, outer vanes movably supported by said outer rotor and projectable into said second working chamber, said control means being laterally shiftable for varying the stroke of said inner vanes, said control means having a first surface engaging the radially inner portions of said outer vanes at all times during operation, said control means having a second surface which engages the outer end portions of the inner vanes at all times during operation, said second surface being eccentric to said first surface, and an outer cam means having an inner surface engaging radially outward portions of said outer vanes for maintaining the radially inward ends of said outer vanes in engagement with said first surface.

6. A device as defined in claim 5, wherein said inner rotor has an outer surface and said outer rotor has an inner surface formed concentric with the outer surface of the inner rotor, said first surface being eccentric to said last-mentioned two surfaces.

7. A device as defined in claim 6, wherein the inner surface of said outer cam means is concentric to said first surface.

8. A hydraulic variable speed transmission which comprises a hollow housing having an inner surface, an inner rotatable rotor supported in said housing, a drive shaft connected to said inner rotor, an outer rotatable rotor supported in said housing and surrounding said inner rotor, a plate member mounted in said housing and constrained from rotation, a control means supported by said plate member and having fluid passageways formed therethrough extending from the inner surface thereof to the outer surface thereof, a first working chamber being disposed between said inner rotor and said control means, a second working chamber being disposed between said outer rotor and said control means, inner vanes movably supported by said inner rotor and projectable into said first working chamber, outer vanes movably supported by said outer rotor and projectable into said second working chamber, said control means being shiftable laterally for varying the stroke of said inner vanes, and an outer ring-like cam means having an inner surface engaging radially outward portions of said outer vanes at all times to maintain said outer vanes in proper operative position during operation, said plate member forming one side wall of each of said working chambers, said outer rotor being drivingly connected to a radially extending flange, said flange forming another side wall of each of said working chambers.

9. A device as defined in claim 8, wherein said control means has a first surface engaging the radially inward end portions of said outer vanes at all times during operation, said first surface being concentric with the inner surface of said outer cam means, and an inner cam means having an outer surface engaging the radially inward ends of said inner vanes at all times for maintaining said inner vanes in proper operative position during operation.

10. A device as defined in claim 9, wherein the radially outer ends of said outer vanes are spaced from the inner surface of said housing thereby forming a cavity between the inner surface of the housing and said inner and outer rotors, at least one check valve mounted in said plate member and having one end thereof in communication with the cavity and the opposite end in communication with one of said working chambers for permitting fluid to flow from said cavity into said working chamber.

11. A hydraulic variable speed transmission which comprises a hollow housing, a drive shaft journaled in said housing and having an inner rotor fixed thereto, a driven shaft rotatably journaled in said housing and having an outer rotor fixed thereto and surrounding said inner rotor, a plate member mounted in said housing and constrained from rotation but being laterally shiftable relative to said housing, a control means fixed to said plate member and having fluid passageways formed therethrough and extending from the inner surface thereof to the outer surface thereof, a first working chamber being disposed between said inner rotor and said control means, a second working chamber being disposed between said outer rotor and said control means, said outer rotor including a radially extending flange forming one side wall of said working chamber, said plate member forming the opposite side wall of said working chamber, inner vanes movably supported by said inner rotor and projectable into said first working chamber, outer vanes movably supported by said outer rotor and projectable into said second working chamber, a first surface engaging the radially inward portions of said outer vanes at all times during operation, said control means having an inner surface concentric with the outer surface of said inner rotor when the control means is in neutral position, said first surface being eccentric with respect to the inner surface of said control means, an inner ring-like cam means having an outer surface engaging the radially inward ends of said inner vanes at all times to maintain the radially outward ends of said inner vanes in engagement with the inner surface of said control means, a ring-like outer cam means having an inner surface engaging the radially outward ends of said outer vanes at all times to maintain the radially inward ends of said outer vanes in engagement with said first surface, and means for maintaining the inner surface of said outer cam means concentric with said first surface, said plate member forming one side wall of each of said working chambers, said outer rotor being drivingly connected to a radially extending flange, said flange forming another side wall of each of said working chambers.

12. A hydraulic variable speed transmission which comprises a hollow housing, a drive shaft journaled in said housing and having an inner rotor fixed thereto, a driven shaft rotatably journaled in said housing and having an outer rotor fixed thereto and surrounding said inner rotor, a plate member mounted in said housing and constrained from rotation, a first ring-like control member fixed to said plate, a second ring-like control member slidably supported by said first control member and guided for lateral movement with respect thereto, said first and second control members having radially aligned fluid passageways extending from the inner to the outer surfaces thereof, a first working chamber being disposed between said second control member and said inner rotor, a second working chamber being disposed between said first control member and said outer rotor, inner vanes movably supported by said inner rotor and projectable into said first working chamber, outer vanes movably supported by said outer rotor and projectable into said second working chamber, and an outer cam means having a surface engaging said outer vanes at all times to maintain the outer vanes in proper operative position during operation, said plate member forming one side wall of each of said working chamber, said outer rotor being drivingly connected to a radially extending flange, said flange forming another side wall of each of said working chambers.

13. A device as defined in claim 12 wherein said second control member has inner and outer surfaces which are concentric with the outer surface of said inner rotor when in neutral position, and said first control member has an outer surface eccentric with respect to the outer surface of said inner rotor.

14. A device as defined in claim 13, including a plurality of cam members supported by said plate and engaging said second control member, and means secured to said cam means and projecting radially outward of said housing for selectively shifting said second control member.

15. A hydraulic variable speed transmission which comprises a hollow housing, a drive shaft rotatably journaled in said housing, and having an inner rotor connected thereto, a driven shaft rotatably journaled in said housing and having an outer rotor connected thereto, said outer rotor surrounding said inner rotor, a plate member mounted in said housing and constrained from rotation but being laterally shiftable relative to said housing, means for shifting said plate laterally of said housing, control means fixed to said plate member and having fluid passageways formed therethrough extending from the inner surface thereof to the outer surface thereof, a first working chamber being disposed between said inner rotor and said control means, a second working chamber being disposed between said control means and said outer rotor, inner vanes movably supported by said inner rotor and being projectable into said first working chamber, outer vanes movably supported by said outer rotor and being projectable into said second working chamber, the inner surface of said control means being concentric to the outer surface of said inner rotor when the control means is in neutral position, the outer surface of said control means being eccentric to the outer surface of said inner rotor, and means engaging said outer vanes to maintain the outer vanes in proper operative position during operation, said plate member forming one side wall of each of said working chambers, said outer rotor being drivingly connected to a radially extending flange, said flange forming another side wall of each of said working chambers.

References Cited in the file of this patent

UNITED STATES PATENTS

| | | |
|---|---|---|
| 1,797,439 | Napier | Mar. 24, 1931 |
| 2,589,362 | Foster | Mar. 18, 1952 |
| 2,691,868 | Nicolas | Oct. 19, 1954 |
| 2,738,649 | Long | Mar. 20, 1956 |

FOREIGN PATENTS

| | | |
|---|---|---|
| 512,587 | Belgium | July 31, 1952 |